United States Patent Office 3,337,538
Patented Aug. 22, 1967

3,337,538
NOVEL HOMOPIPERAZINE ALKYL SUBSTITUTED IMINOSTILBENE COMPOUNDS
Wilhelm Alfons Schuler, Bad Homburg vor der Hohe, and Helmut Beschke, Frankfurt am Main, Germany, assignors to Deutsche Gold- und Silber-Scheideanstalt vormals Roessler, Frankfurt am Main, Germany
No Drawing. Filed Mar. 9, 1966, Ser. No. 532,852
Claims priority, application Germany, Mar. 15, 1962, D 38,363, D 38,364
4 Claims. (Cl. 260—239)

This is a continuation-in-part of application Ser. No. 264,048, filed Mar. 11, 1963, and now abandoned.

The present invention relates to new compounds having pharmacological activity and more particularly to homopiperazine alkyl derivatives of iminostilbene of the following formula:

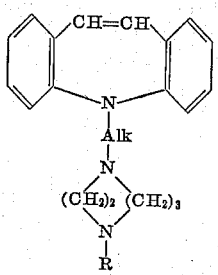

and their salts and quaternary ammonium compounds. In such formula Alk represents a straight or branch chained alkylene radical with 1 to 4 carbon atoms and R is a lower alkyl, lower hydroxy alkyl and lower alkanoic acyl oxy lower alkyl radical.

The antidepressive action of the compounds according to the invention is indicated by their intensification of the pressor activity of adrenalin and nor-adrenalin on the blood pressure of narcoticized cats and their antagonism to bulbocapnin induced catalepsy in mice.

The intensification of the pressor action of adrenalin and nor-adrenalin on the blood pressure occurs at a dosage level of 0.5 mg./kg. (intravenous injection). The dosage range for antagonism to the effects of bulbocapnin is between 4 and 26 mg./kg. (subcutaneous injection).

The acute toxicity (LD 50) of the compounds according to the invention when tested on mice is 535–772 mg./kg. when administered orally, 156–181 mg./kg. when administered intraperitoneally and 600–1120 mg./kg. when administered subcutaneously. When tested on rats the LD 50 upon oral administration is 2400–3500 mg./kg. When tested for semichronic toxicity on rats the threshold toxicity was reached at a daily dosage of 200 mg./kg. administered orally over a period of 6 weeks.

The administration of the compounds according to the invention can be enteral or parenteral.

The compounds according to the invention are especially useful in view of their psychopharmaceutical properties, particularly as antidepressive and antipsychotics. They furthermore are marked by the lack of undesired side effects such as sedative action and cataleptic action.

The compounds according to the invention in abortive tests carried out on rats did not give rise to any birth malformations even when administered in large dosages.

These compounds can be prepared by reacting iminostilbene of the formula:

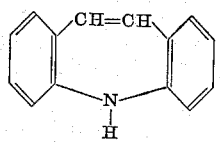

with a homopiperazino compound of the formula

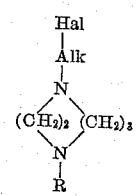

in which Hal is a halogen atom, preferably chlorine or bromine. Preferably, such reaction is carried out at raised temperatures and in the presence of an acid binding agent, such as, sodium amide, as well as an organic solvent.

It is also possible to prepare the compounds according to the invention by reacting iminostilbene compounds of the formula:

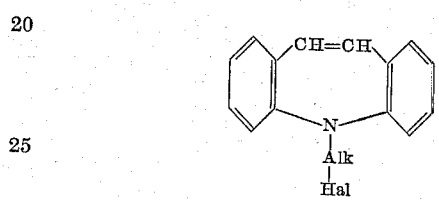

with homopiperazino compounds of the following formulae:

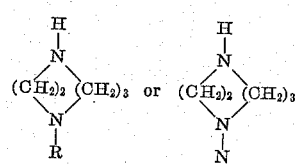

preferably under reaction conditions similar to those described above, and in the latter instance introducing the substituent R into the homopiperazino radical of the compound formed by treatment with an alkyl ester, such as, methyl bromide or dimethyl sulfate or with a halogen substituted alkanol or a halogen substituted alkoxy alkanoic acyl ester, also, expediently at elevated temperatures in the presence of an acid binding agent and an inert organic solvent.

The compounds according to the invention can also be prepared by reduction of compounds of the formula:

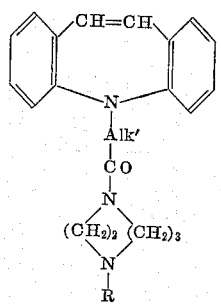

in which Alk' represents an alkylene group with one less carbon atom than Alk in the preceding formula. The reduction can be effected in a known manner, for example, with lithium aluminum hydride in the presence of ether as solvent.

A further possibility of producing the iminostilbene compounds according to the invention is by dehydrogenation of the corresponding iminodibenzyl compounds of the formula

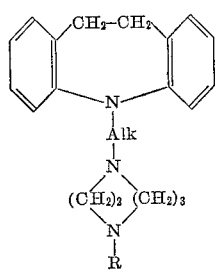

for example, by bromination of one methylene group of the iminodibenzyl radical, for example, with N-bromine succinimide and then splitting off hydrogen bromide with a tertiary amine, such as, triethyl amine. Such dehydrogenation can also be effected directly with elemental bromine at elevated temperatures under the influence of light. In addition, such dehydrogenation can also be carried out by heating in the presence of an appropriate catalyst, such as, palladium-carbon. In such dehydrogenation the yields can be increased by use of vacuum or suited hydrogen acceptors, such as maleic acid dimethyl ester.

The compounds according to the invention can be converted to their acid addition salts and the quaternary ammonium compounds preferably with acids having pharmaceutically acceptable anions and with pharmaceutically acceptable quaternizing agents. Of course, it is also possible to form other salts from any given salt by procedures well known per se.

The following examples will serve to illustrate the invention with reference to several specific embodiments thereof. In such examples the proportions are given in parts by weight unless otherwise specified.

*Example 1*

3.9 parts of sodium amide were added to a solution of 19.3 parts of iminostilbene in 100 parts of toluene and the mixture boiled under reflux. Thereupon a solution of 22.1 parts of γ-bromopropyl homopiperazine in toluene was added dropwise over a 20 minute period and the mixture then refluxed for a further 5 hours. The reaction mixture was then poured on ice and the toluene layers extracted with HCl at a pH of 4. The resulting extract was alkalized and extracted with diethyl ether and distilled under vacuum. 2.5 parts of homopiperazino-propyl-iminostilbene distilled over at 216–222° C. under a pressure of 0.5 mm. Hg. This was boiled under reflux for 6 hours in 200 parts of butanol having 12 parts of potash and 7 parts of ethylene chlorohydrin added thereto. After suction filtering, the filtrate was distilled under vacuum. 23 parts of N'-hydroxyethyl-homopiperazino-propyl-iminostilbene of a boiling point of 219–224° C. at 0.3 mm. Hg were obtained. The difumarate thereof melts at 136–137° C.

*Example 2*

30 parts of iminostilbene were reacted with 6 parts of sodium amide in 300 parts of toluene by boiling under reflux until evolution of gas ceased. Thereafter, 33 parts of N'-methyl homopiperazino-propyl-chloride dissolved in 150 parts of toluene were added dropwise. The reaction mixture was then refluxed for a further 14 hours. After cooling, the reaction mixture was poured on ice and the reaction product recovered by extraction and distillation analogous to the procedures of the preceding example. The N'-methyl-homopiperazino-propyl-iminostilbene had a boiling point of 226–235° C. at 2 mm. Hg. The difumarate thereof had a melting point of 173–174° C.

*Example 3*

5 parts of N'-methyl-homopiperazine-propyl-iminodibenzyl were heated with 2 parts palladium carbon (50%) for 3 hours under vacuum to a temperature of about 190° C. The reaction product was dissolved in benzene and filtered off from the catalyst and filtered through a column of aluminum oxide. The layer with the desired reaction product fluoresced in UV light and was separated off. About 2.1 g. of N'-methyl-homopiperazino-propyl-iminostilbene were obtained. The difumarate thereof after reprecipitation from isopropanol had a melting point of 173–174° C.

The starting N'-methyl-homopiperazine-propyl-iminodibenzyl was prepared as follows:

The procedure of Example 2 was repeated except that 30 parts of iminodibenzyl were employed instead of the iminostilbene. The resulting N'-methyl-homopiperazino-propyl-iminodibenzyl had a boiling point of 231–240° C. at 2 mm. Hg. The difumarate had a melting point of 188–191° C.

*Example 4*

The procedure of Example 3 was repeated except that N'-hydroxyethyl - homopiperazino - propyl-iminodibenzyl was employed instead of the N'-methyl-homopiperazino-propyl-iminodibenzyl and the analogous N'-hydroxyethyl-homopiperazino-propyl-iminostilbene was obtained. The difumarate thereof had a melting point of 136–137° C.

The N'-hydroxyethyl - homopiperazino-propyl-iminodibenzyl used as a starting material was prepared as follows:

The procedure of Example 1 was followed except that 19.5 parts of iminodibenzyl replaced the 19.3 parts of iminostilbene and the reaction mixture was refluxed for 6 hours instead of 5 hours in the first stage and that 100 parts of butanol instead of 200 parts and 6 parts of ethylene chlorohydrin were used instead of the 7 parts in the second stage and the reflux in such second stage was only 4 hours. 22 parts of homopiperazino-i-propyl-iminodibenzyl of a boiling point of 215–220° C. at 1 mm. Hg were recovered in the first stage of the reaction and 21 parts of N'-hydroxyethyl-homopiperazino-n-propyl-iminodibenzyl of a boiling point of 225–230° C. at 1 mm. Hg were recovered in the second stage. The dihydrochloride thereof obtained with isopropanolic hydrochloric acid had a melting point of 119–121° C.

*Example 5*

25 parts of 5-(3-homopiperazino-propyl)-iminostilbene were refluxed with 11 parts of β-chloroethyl acetate and 15 parts of potash in 200 parts of xylene while stirring for 6 hours. The xylene layer was extracted with dilute HCl ice cold and the acid layer alkalized and extracted with chloroform. After the chloroform was evaporated 19 parts of crude 5-[3-(N'-acetoxyethyl-homopiperazino)-propyl]-iminostilbene were obtained. The difumarate thereof was precipitated in isopropanol, such difumarate after recrystallizing had a melting point of 142–145° C.

We claim:

1. A compound of the formula

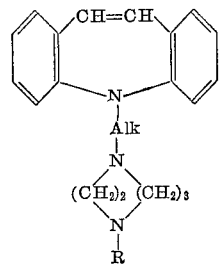

wherein Alk is alkylene of 1 to 4 carbon atoms and R is selected from the group consisting of lower alkyl, lower hydroxyalkyl and lower alkanoic acyl oxy lower alkyl.

2. A compound according to claim 1 wherein Alk is n-propyl and R is methyl.

3. A compound according to claim 1 wherein Alk is n-propyl and R is hydroxy ethyl.

4. A compound according to claim 1 wherein Alk is n-propyl and R is acetoxyethyl.

References Cited

UNITED STATES PATENTS 3,040,043  6/1962  Schuler et al. _____ 260—239
3,074,931  1/1963  Craig _____ 260—239

OTHER REFERENCES

Craig et al.: J. Org. Chem., vol. 26, pages 135–8 (1961).
Hollister; Ann. Internal Medicine, vol. 51, pp. 1032–1047 (1959).

ALEX MAZEL, *Primary Examiner.*

A. D. ROLLINS, *Assistant Examiner.*